(12) United States Patent
Chochoy

(10) Patent No.: US 8,181,332 B2
(45) Date of Patent: May 22, 2012

(54) METHOD OF INSERTING AN UNDULATING WINDING INTO A STATOR

(75) Inventor: Jean-Pierre Chochoy, Cremarest (FR)

(73) Assignee: Valeo Equipments Electriques Moteur, Creteil (FR)

( * ) Notice: Subject to any disclaimer, the term of this patent is extended or adjusted under 35 U.S.C. 154(b) by 953 days.

(21) Appl. No.: 10/597,918

(22) PCT Filed: Feb. 24, 2005

(86) PCT No.: PCT/FR2005/000433
§ 371 (c)(1),
(2), (4) Date: Apr. 28, 2008

(87) PCT Pub. No.: WO2005/091474
PCT Pub. Date: Sep. 29, 2005

(65) Prior Publication Data
US 2008/0224563 A1  Sep. 18, 2008

(30) Foreign Application Priority Data
Feb. 24, 2004 (FR) .................................. 04 01824

(51) Int. Cl.
*H02K 15/00* (2006.01)
(52) U.S. Cl. ................. 29/596; 29/605; 29/606

(58) Field of Classification Search ............. 29/596, 29/564.5, 605, 606, 732, 734, 736, 760, 762; 310/40 R, 71, 184, 254.1
See application file for complete search history.

(56) References Cited

U.S. PATENT DOCUMENTS

| | | | |
|---|---|---|---|
| 4,449,288 A | 5/1984 | Disclaire et al. | |
| 4,750,258 A * | 6/1988 | Anderson | 29/596 |
| 4,864,715 A | 9/1989 | Sadier | |
| 5,270,605 A | 12/1993 | Lefrancois et al. | |
| 6,614,141 B2 | 9/2003 | Oohashi et al. | |
| 6,851,175 B2 | 2/2005 | Brown et al. | |
| 2002/0079772 A1 | 6/2002 | Oohashi et al. | |

FOREIGN PATENT DOCUMENTS

| | | |
|---|---|---|
| EP | 0515259 | 11/1992 |
| EP | 1294082 | 3/2003 |
| FR | 2745444 | 8/1997 |

* cited by examiner

*Primary Examiner* — Thiem Phan
(74) *Attorney, Agent, or Firm* — Jacox, Meckstroth & Jenkins

(57) ABSTRACT

A method of inserting an undulating winding into an alternator stator. The method comprises the following steps consisting of shaping each phase winding into a succession of crenels comprising two lateral branches which are intended to be attached at a position for reception in a slot, positioning the windings on an insertion tool and inserting the turns into the slots of the stator in the reverse order to the winding order. The windings are wound around the insertion tool simultaneously, and the turns that succeed one another in a determined winding order belong alternatively to different windings.

15 Claims, 7 Drawing Sheets

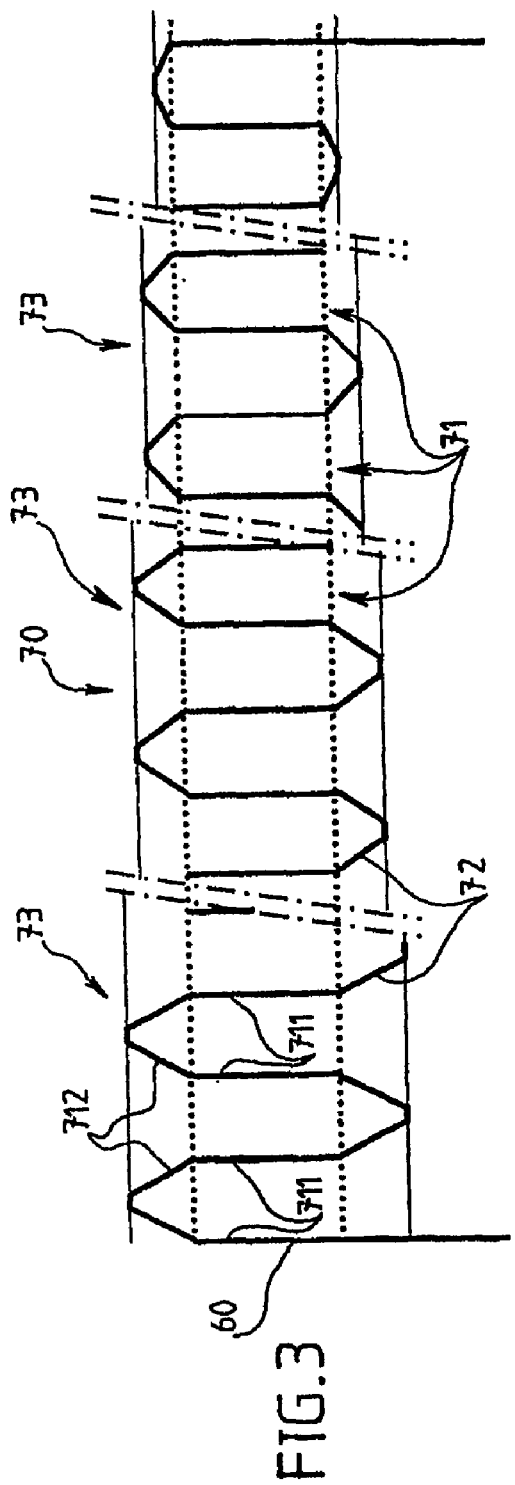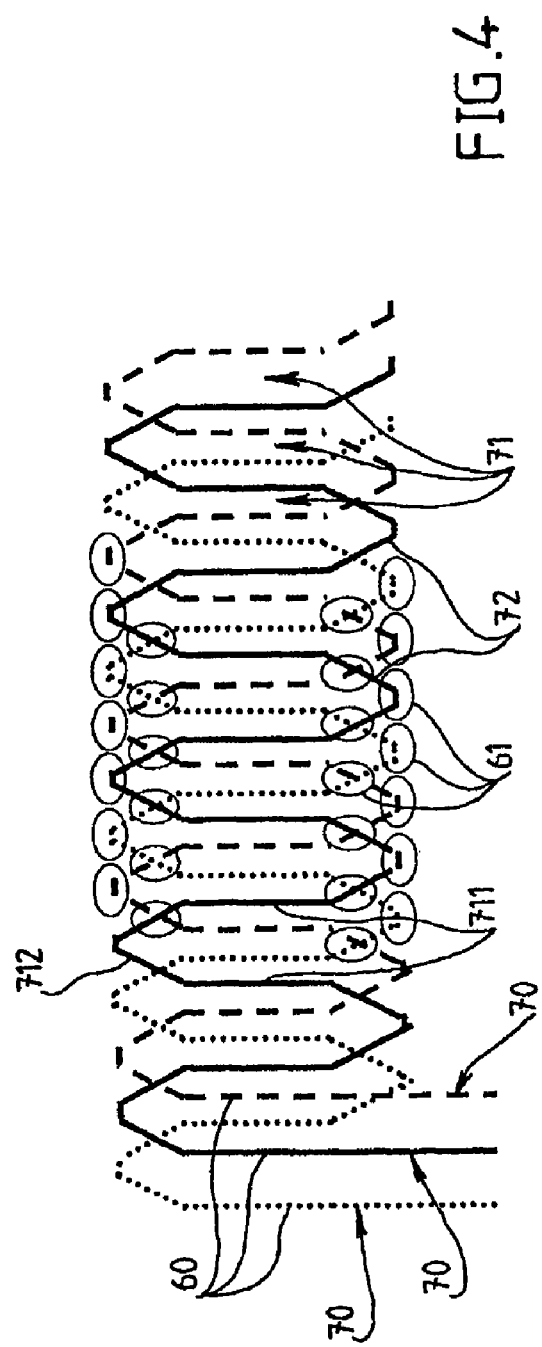

METHOD OF INSERTING AN UNDULATING WINDING INTO A STATOR

BACKGROUND OF THE INVENTION

1. Field of the Invention

The invention in general concerns rotating electrical machines of the polyphase type, such as motor vehicle alternators or alternator starters.

2. Description of the Related Art

Methods of this type are known in the prior art, for example through the document U.S. Pat. No. 4,864,715. In this document, each phase winding comprises several turns and the phases are placed successively on the insertion tool in the form of a receiving wheel, and then inserted into the slots of the laminations by means of a tool comprising expelling members formed to be movable radially. Insertion is carried out phase by phase.

It should be noted that the receiving wheel has a thickness substantially equal to that of the stator.

Stators formed by this method have on both sides of the laminations very tightly packed winding overhangs, offering high resistance to the circulation of air. Moreover, the winding overhangs are non-symmetrical, one of the winding overhangs having an axial height greater than that of the other winding overhang, which is also unfavorable for the circulation of air for cooling these winding overhangs.

Furthermore, the rate of filling the slots, that is to say, the ratio between the cross-section of the bare conductive wire, usually made from copper, and the complete cross-section of the slot in which there is mounted a slot isolator intervening between the edges of the slots and the wires, is higher but the forces necessary for inserting the conductive wires into the slots are very large and can, under certain conditions, prejudice the quality of the product since there are many differing interactions between the conductive wires.

More precisely, the phase inserted last must push the phases inserted previously. The forces are poorly transmitted from one phase to another.

Under certain conditions this may prejudice the quality of the product.

SUMMARY OF THE INVENTION

Within this context, the aim of the present invention is to overcome the faults mentioned above.

More precisely, the invention concerns according to a first aspect a method of inserting a wave winding into a stator of a rotating electrical machine, such as a motor vehicle alternator or alternator starter, the stator comprising laminations with a hole through the centre and having an axis of symmetry and slots passing through axially made in a radially inner face of the laminations, these slots providing a plurality of receiving positions arranged in tiers radially, the winding comprising a plurality of phase windings each consisting of an electrically conductive continuous wire, the method comprising the following steps:

1) shaping each winding, the wire thereof being formed into a succession of crenellations connected by linking segments, each crenellation comprising two lateral branches facing one another each intended to be inserted at a receiving position of a slot, and a top branch connecting the two lateral branches;
2) placing the windings on an insertion tool;
3) inserting the turns into the slots of the stator.

To this end, the method of the invention, in other respects conforming to the generic definition given by the preamble above, is essentially characterized in that step 2) of placing the windings is implemented on a cylindrical insertion tool, each winding constituting several turns around the insertion tool, these turns being superimposed in a given order, and in that the windings are wound around the insertion tool at the same time, the turns that follow one another in said given winding order belonging alternately to the different windings.

According to one characteristic, step 3) of inserting the turns into the slots of the stator is implemented in the reverse order to the winding order, the lateral branches of these turns progressively occupying radially more inner positions.

By virtue of the invention, all the phases can be inserted at the same time and the rate of filling the slots is further increased since in particular the positioning of the lateral branches in the slots is well controlled during transfer of the turns from the insertion tool to the slots of the stator.

Moreover, the same insertion tool can be used for stators having laminations of a different length.

In one possible embodiment of the invention, the winding order comprises a succession of identical sequences, each sequence consisting of one turn of each winding.

According to another advantageous characteristic, the crenellations extend over the insertion tool in respective planes parallel to the axis of symmetry of the insertion tool, or slightly inclined with respect to this axis.

Moreover, step 3) of inserting the windings into the slots is implemented by moving the insertion tool along the axis of symmetry of the stator, that is to say axially.

Advantageously, the lateral branches of the same crenellation are substantially straight and parallel to one another.

Preferably, the top branches of the crenellations are curved and form a winding overhang on a first axial side of the stator.

Similarly, the linking segments connect two respective lateral branches of two neighboring crenellations along the wire and have a curved shape, these segments forming a winding overhang on a second axial side of the stator opposite to the first. By virtue of the invention, non-symmetrical or symmetrical winding overhangs with air passages between the inside and outside of the winding overhangs can be obtained.

According to another advantageous characteristic, the top branches and/or the linking segments formed at step 1) have increasing or decreasing heights along the windings in order to obtain a good rate of filling the slots.

In this case, the turns whose lateral branches are inserted in radially outer positions of bottoms of slots have top branches and/or linking segments with heights relatively greater than the turns whose lateral branches occupy radially inner positions.

According to yet another advantageous characteristic, the method comprises, after step 3), a step 4) of shaping the winding overhangs by inclining the linking segments and/or the top branches towards the inside.

Alternatively it comprises, after step 3), a step 4) of shaping the winding overhangs by inclining the linking segments and/or the top branches towards the outside.

Furthermore, it should be noted that the method comprises, between steps 1) and 2), a step 1') of local shaping of the wire in areas of this wire intended to cross other wires, or other areas of the same wire, once the windings have been inserted into the stator.

Preferably, the local shaping of the wire consists of locally deforming the cross-section of the wire, or of locally curving the wire.

In this case, the local shaping is implemented by pinching, stamping or milling.

Advantageously, the wire has a round cross-section, the slots having a circumferential width that is a multiple of the diameter of the wire.

In one possible embodiment, the slots have a circumferential width corresponding to the diameter of the wire, the branch occupying the radially most inner position being deformed by broadening in a circumferential direction so as to hold the branches occupying the other positions inside the slot.

In another possible embodiment, the slots have a circumferential width equal to at least two diameters of the wire and have on a radially inner side an opening partially closed on two opposite sides by two axial steps, the branches occupying the slots being held inside it by a flat wedge resting on the steps on an inner side of the slot.

Moreover, the slots have a radial depth that is a multiple of the diameter of the wire.

Finally, the winding can be of the simplex wave type or the distributed wave type.

According to a second aspect, the invention concerns a stator of a polyphase rotating electrical machine, such as a motor vehicle alternator or alternator starter, this stator comprising laminations with a hole through the centre having an axis of symmetry, slots passing through axially made in a radially inner face of the laminations each providing a plurality of receiving positions arranged in tiers radially, and a winding comprising a plurality of phase windings each consisting of an electrically conductive continuous wire;

the wire of each winding being formed into a succession of crenellations connected by linking segments, each crenellation comprising two lateral branches opposite one another each coming to be inserted at a receiving position of a slot, and a top branch connecting the two lateral branches;

each winding constituting several turns around the stator;

the turns of the windings being inserted into the slots in a given order, the lateral branches of these turns progressively occupying radially more inner positions;

characterized in that the turns that follow one another in said given order belong alternately to the different windings.

Advantageously, the given order comprises a succession of identical sequences, each sequence consisting of one turn of each winding.

Preferably, the lateral branches of the same crenellation are substantially straight and parallel to one another.

For example, the top branches of the crenellations are curved and form a winding overhang on a first axial side of the stator.

Moreover, the linking segments connect two respective lateral branches of two neighboring crenellations along the wire and have a curved shape, these segments forming a winding overhang on a second axial side of the stator opposite to the first.

According to a variant implementation, the linking segments and/or the top branches constituting the winding overhangs are inclined towards the inside.

Alternatively, the linking segments and/or the top branches constituting the winding overhangs are inclined towards the outside.

Preferably, the wire is shaped locally in areas of this wire crossing other wires or other areas of the same wire.

In this case, the local shaping of the wire consists of locally deforming the cross-section of the wire, or of locally curving the wire.

Advantageously, the local shaping is implemented by pinching, stamping or milling.

According to another advantageous characteristic, the wire has a round cross-section, the slots having a circumferential width that is a multiple of the diameter of the wire.

In a variant implementation, the slots have a circumferential width corresponding to the diameter of the wire, the branch occupying the most radially inner position being deformed by broadening in a circumferential direction so as to hold the branches occupying the other positions inside the slot.

In another variant implementation, the slots have a circumferential width equal to at least two diameters of the wire and have on a radially inner side an opening partially closed on two opposite sides by two axial steps, the branches occupying the slots being held inside it by a flat wedge resting on the steps on an inner side of the slot.

Moreover, the slots have a radial depth that is a multiple of the diameter of the wire.

Finally, the winding can be of the simplex wave type or the distributed wave type.

Of course, all the aforementioned characteristics can be present individually or in combination.

These and other objects and advantages of the invention will be apparent from the following description, the accompanying drawings and the appended claims.

BRIEF DESCRIPTION OF THE ACCOMPANYING DRAWINGS

Other characteristics and advantages of the invention will emerge clearly from the description given below, for information only and in no way limiting, with reference to the accompanying figures, amongst which:

FIG. 2 is an expanded schematic representation of a phase winding of the stator of FIGS. 1B and 2B, after shaping at step 1);

FIG. 4 is an expanded schematic representation of three phase windings of the stator of FIGS. 1B and 2B, showing the areas where these three windings cross in the stator after insertion, the circles indicating the areas of local shaping;

Figure 2A:
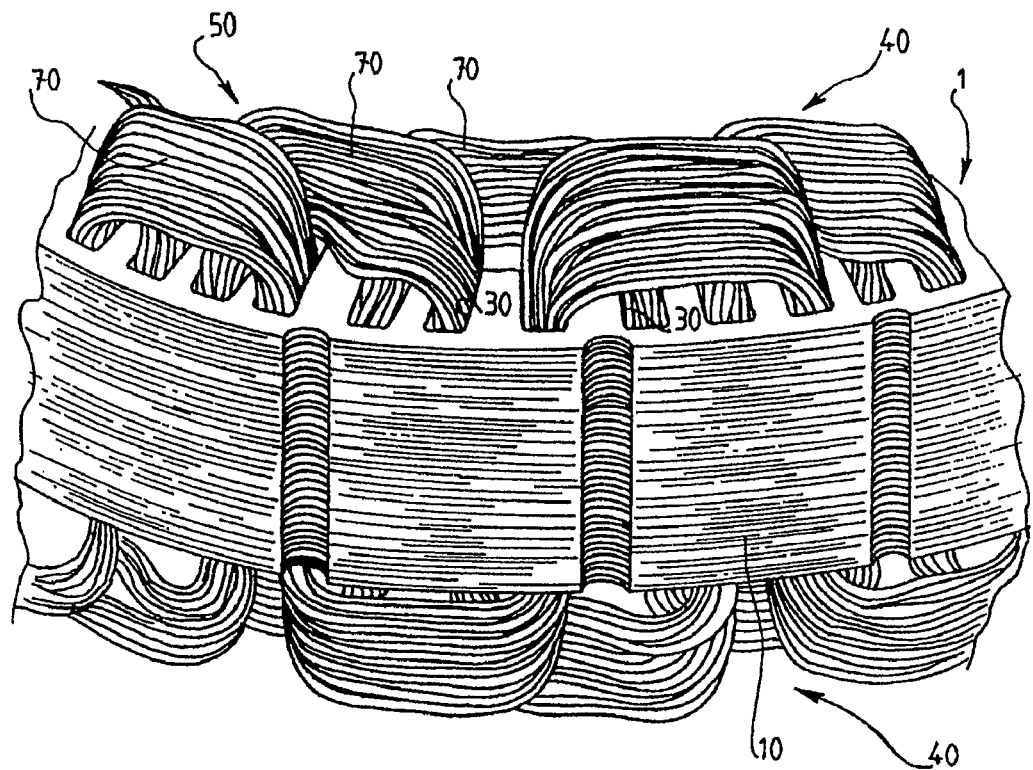
FIGS. 2A and 2B are perspective views of the stators of FIGS. 1A and 1B.

The insertion method is adapted to a wave winding 50 to be inserted into a stator 1 of a motor vehicle alternator or alternator starter.

DETAILED DESCRIPTION OF THE PREFERRED EMBODIMENTS

In the implementation assembly the stator 1 comprises a body in the form of cylindrical laminations 10 having an axial axis of symmetry 20 (FIG. 10), and axial slots 30 made in a radially inner face 11 of the laminations 10. The slots 30 are separated from one another by axial ribs 35 referred to as teeth (FIGS. 11A, 11B).

These slots 30 pass axially right through the laminations 10 with a hole through the center since they extend over the entire axial length of the laminations 10 and are open radially on an inner side and at the two opposite axial ends. These slots 30 each provide a plurality of receiving positions arranged in tiers radially.

The winding 50 comprises a plurality of phase windings 70 each consisting of an electrically conductive continuous wire 60 (FIGS. 3 and 4). The wire is for example made from copper covered with an insulator such as varnish. Each phase winding 70 comprises several turns 73, one turn corresponding to one stator body revolution.

Figure 2B:
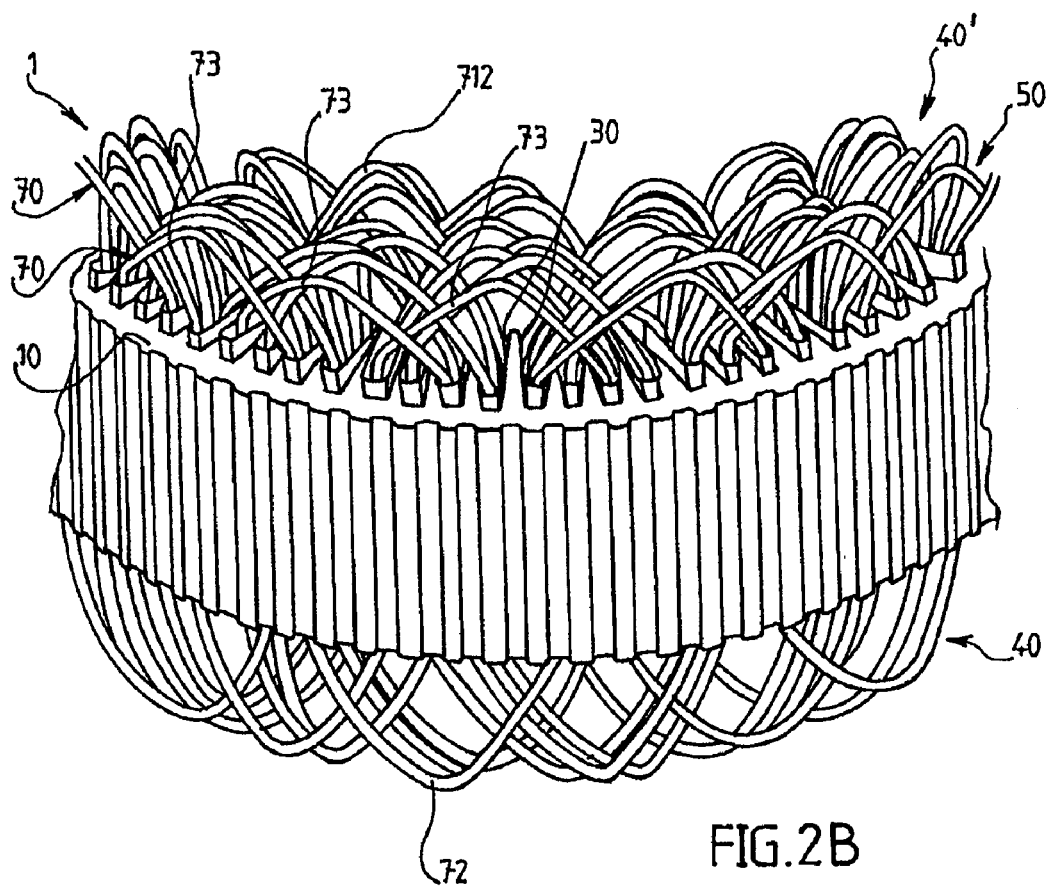

In a known manner, a slot insulator, visible in FIG. 2B, is interposed between the wires and the edge of the slots.

Figure 10:
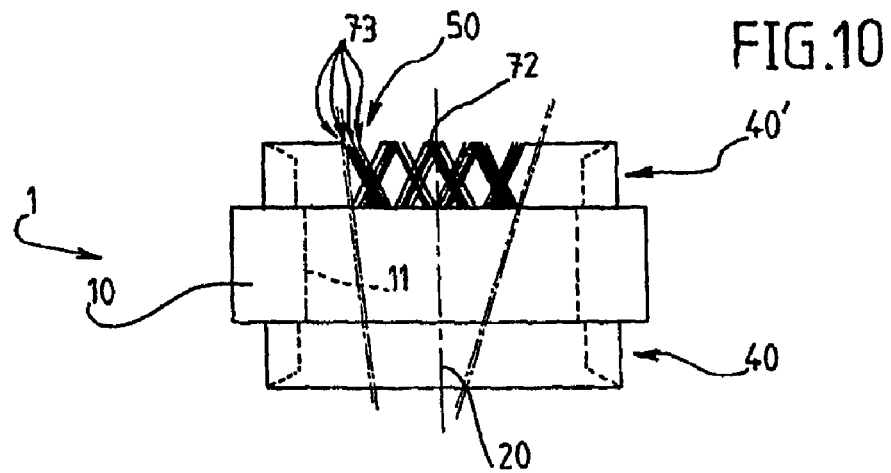
FIG. 10 is a schematic side view of a stator obtained in accordance with the invention.
Figures 11A, 11B:
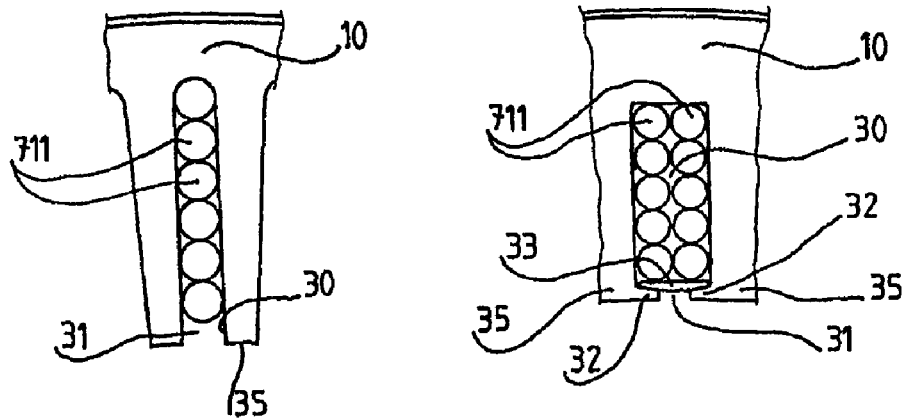
FIGS. 11A, 11B and 11C are schematic representations of the cross-sections respectively of a slot of a stator of the invention with a width corresponding to one wire diameter, to two wire diameters and a slot of a stator of the prior art.

The wires 60 and the phase windings 70 form winding overhangs 40, 40' outside the laminations 10, either side thereof, as can be seen for example in FIGS. 2B and 10. These winding overhangs can be well spaced out and compact by virtue of the insertion method according to the invention.

The method comprises the following steps:
1) shaping each winding 70;
2) placing the windings 70 on an insertion tool 80 (FIG. 5);
3) inserting the turns 73 into the slots 30 of the stator.

In the first step, the wire 60 of the winding is formed into a succession of crenellations 71 connected by linking segments 72, as illustrated in FIG. 3. Each crenellation 71 comprises two lateral branches 711 facing one another each intended to be inserted at a receiving position of a slot 30, and a top branch 712 connecting the two lateral branches 711.

Figure 11C:
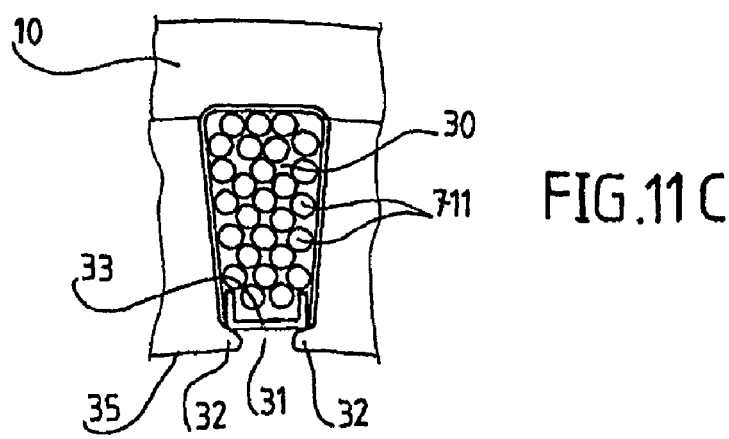

The slots each provide a plurality of positions for receiving lateral branches arranged in tiers radially on several levels (FIGS. 11A to 11C).

According to one characteristic, the linking segments 72 and the top branches 712 are of inclined shape in order to make the winding overhangs 40, 40' more compact and facilitate the flow of air.

Here the segments 72 and the branches 712 have the shape of a V with a flat top.

Figure 5:
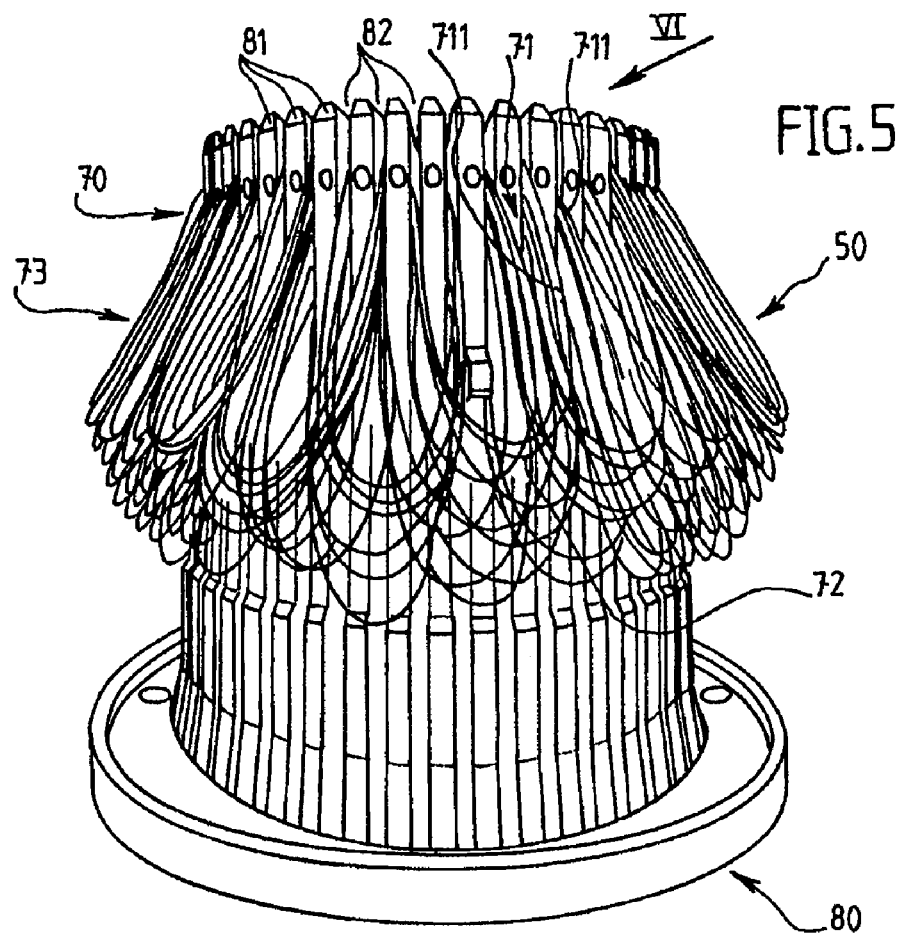
FIG. 5 is a side view of the insertion tool after placing of the windings on this tool at step 2)
Figure 6:
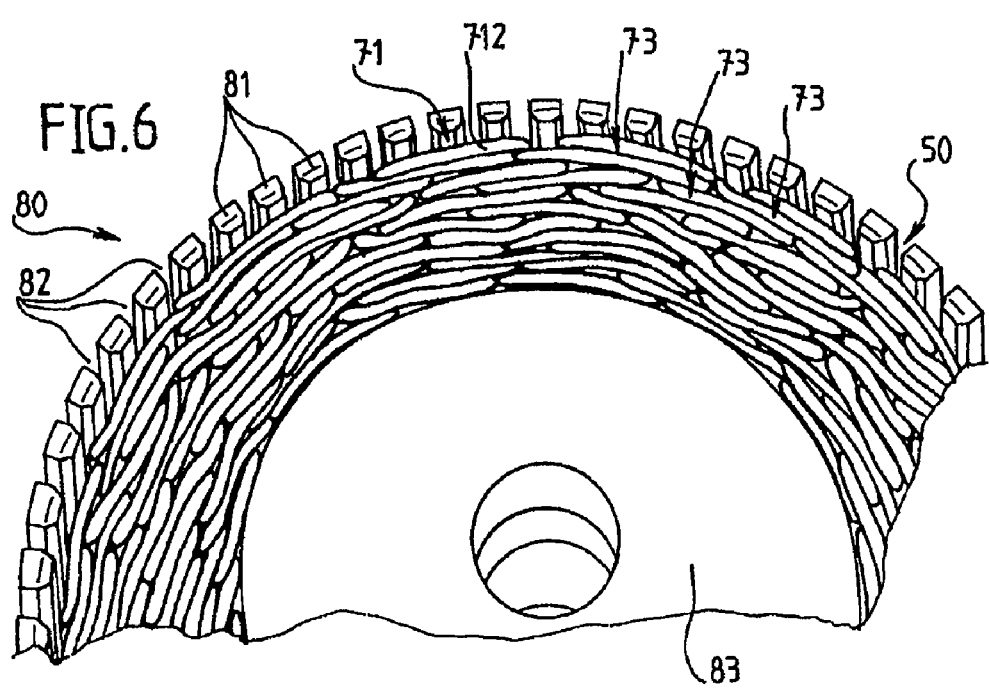
FIG. 6 is a perspective view along arrow VI of FIG. 5.

In the second step, the placing of the windings is, according to one characteristic, implemented on a cylindrical tool, as illustrated in FIG. 5. Each winding 70 constitutes several turns 73 around the insertion tool 80.

The wires 60 and the phase windings 70 are better arranged and better supported than in the tool in the form of a receiving wheel of the document U.S. Pat. No. 4,864,715.

In the third step, the turns 73 are superimposed in a given order.

Moreover, this facilitates an axial insertion of the windings, advantageously in a single go, or in a variant in several goes.

Figure 7B:
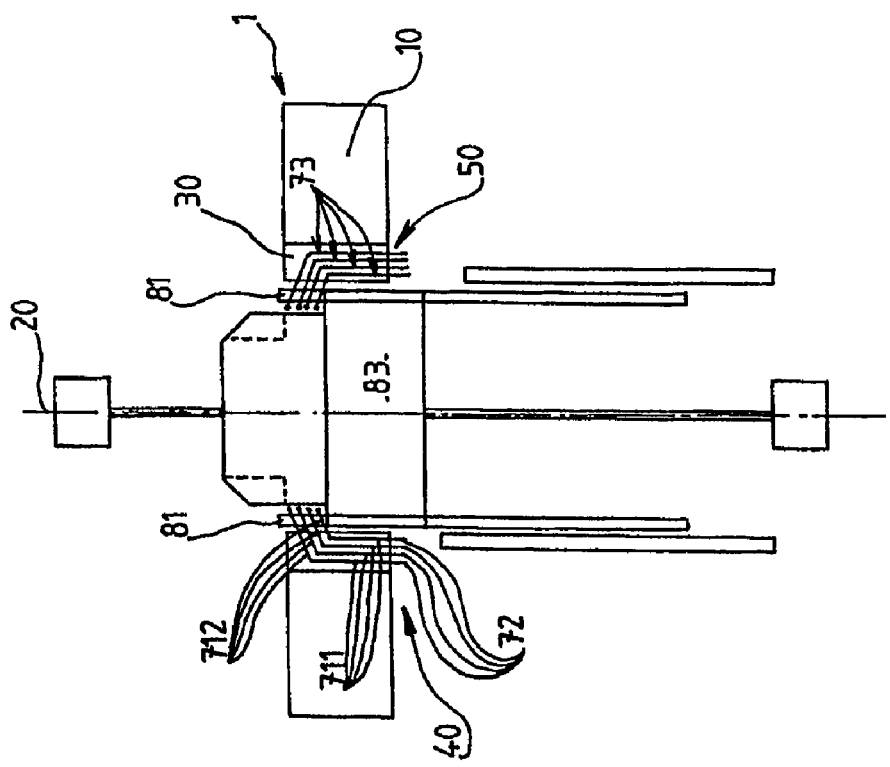
FIGS. 7A and 7B are schematic representations illustrating step 3) of inserting the turns into the slots of the stator by axial movement of the insertion tool.
Figure 7A:
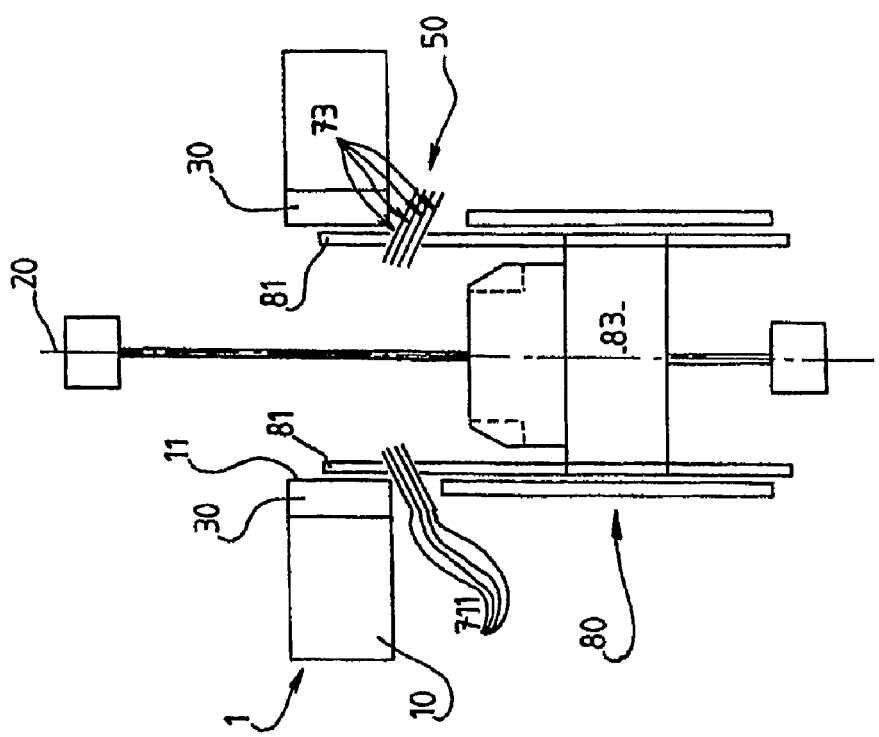
Figure 8:
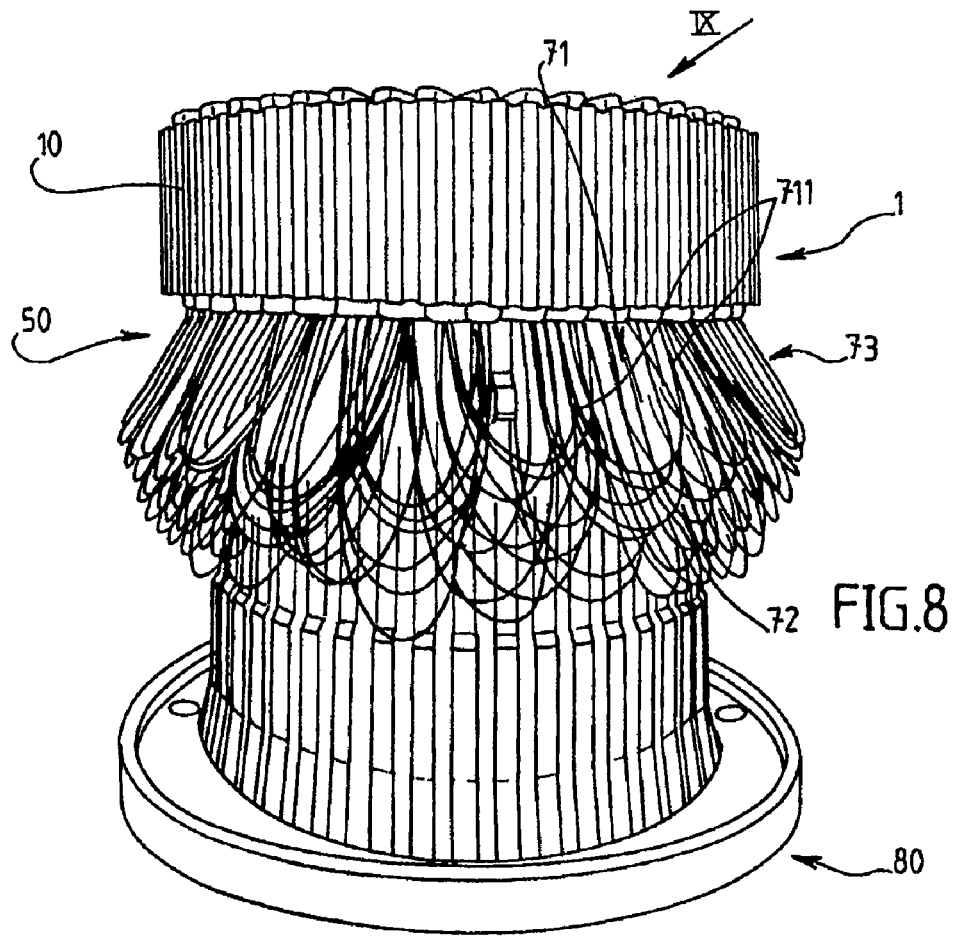
FIG. 8 is a side view of the laminations and the insertion tool at step 3)

In the third phase, the insertion of the turns 73 into the slots 30 of the stator 1 is implemented in the reverse order to the winding order, by means of the tool 80, the lateral branches 711 of these turns 73 progressively occupying radially more inner positions as the turns 73 are inserted, as illustrated in FIGS. 7A and 7B.

A regular, or in a variant an irregular, insertion can thus be implemented, in a controlled manner.

It can be seen in FIG. 5 that the insertion tool 80 comprises a plurality of fingers 81 parallel to the axial axis of symmetry of the tool, disposed in a circle, having free ends turned on an upper axial side of the tool, these fingers being separated by gaps 82.

During placing of the windings at step 2), the windings 70 are disposed on the insertion tool so that the lateral branches 711 of each crenellation 71 are each disposed in a gap 82 and extend essentially outside the circle, the top branch 712 connecting the lateral branches by a side internal to the circle, the linking segments 72 connecting the crenellations by a side external to the circle.

The turns 73 are threaded by the upper side of the tool 80 over the free ends of the fingers 81, and are superimposed parallel to the axis of symmetry of the insertion tool 80, the turns put in place first being disposed on the lower side of the tool and the turns put in place last being disposed on an upper side of the tool 80.

There are an equal number of gaps 82 and slots 30.

At step 3), the turns 73 are transferred from the insertion tool 80 to the laminations 10, the lateral branches 711 of the crenellations 71 of the same turn 73 being inserted into a plurality of slots 30 distributed regularly around the laminations 10, these slots being separated from one another by the same number of other slots 30. The top branches 712 form a winding overhang 40 on a first axial side of the laminations 10, and the linking segments 72 form another winding overhang 40' on a second axial side of the laminations 10 opposite to the first.

The turns 73 are inserted into the slots 30 concentrically, the turns 73 inserted first being disposed radially at the outside in the bottom of the slots, and the turns 73 inserted last being disposed radially at the inside of the laminations 10 at the level of the opening of the slots.

According to one characteristic of the invention, the windings 70 are wound around the insertion tool 80 at the same time at step 2), hence as a result the turns 73 that follow one another in the given winding order belong alternately to the different windings 70.

In one particularly advantageous embodiment, the winding order comprises a succession of identical sequences, each sequence consisting of one turn 73 of each winding 70.

After insertion of the turns 73 into the slots 30 at step 3), there is found in the stator, from outside to inside, a first series of turns 73 comprising one turn 73 of each winding 70, then a second series of turns identical to the first, then a third, etc.

The slots 30 occupied by the lateral branches 711 of the turns of a given winding 70 are shifted angularly with respect to the slots 30 occupied by the lateral branches 711 of the turns of the other windings 70 forming part of the same series.

Thus, in the winding overhangs 40, 40', the top branches 712 and the linking segments 72 of the turns of the same series are not aligned radially but on the contrary shifted angularly with respect to one another, as seen in FIG. 2B.

As a result, the top branches 712 and the linking segments 72 of the turns do not, in the winding overhangs 40, 40', constitute compact blocks opposing the circulation of air for cooling the rotating electrical machine.

According to another characteristic of the invention that can be seen in FIG. 5, the crenellations 71 extend in respective planes parallel to the axis of symmetry of the insertion tool 80, or slightly inclined with respect to this axis, once the turns 73 are wound on the insertion tool 80.

This characteristic is particularly important on account of step 3) of inserting the windings 70 into the slots 30 being implemented by moving the insertion tool 80 along the axis of symmetry 20 of the stator 1, that is to say axially.

The fingers 81 define the external diameter of the tool 80, this diameter being slightly smaller than the internal diameter of the laminations 10.

As shown in FIGS. 7A and 7B, the tool 80 comprises, besides the fingers 81, a mushroom 83 movable axially at the centre of the cylinder constituted by the fingers 81. The mushroom 83 has an external diameter practically equal to the internal diameter of the cylinder constituted by the fingers 81.

The insertion tool 80 is disposed under the second axial side of the stator 1, its upper end being turned upwards.

The tool 80 moves, here axially along the axis 20 of FIGS. 7A, 7B, upwards in order to insert the turns 73, the fingers 81 and the mushroom 83 moving, here axially, parallel during a first phase of inserting the lateral branches 711 into the slots 30, then during a second phase the fingers 81 remaining stationary whilst the mushroom 83 continues to move.

During the first phase, the mushroom 83 moves at the same speed as the fingers 81. The lateral branches 711 enter from the bottom into the slots 30 and slide upwards along the slots 30. First it is a portion of each lateral branch 711 extending immediately outside the fingers 81 that engages in the corresponding slot 30, then, progressively with the movement of the insertion tool 80 upwards, the whole lateral branch 711 from the finger up to the linking segment 72.

The first phase finishes when the free end of the fingers 81 reaches the level of the axial face of the laminations 10 turned on the first side.

Figure 9:
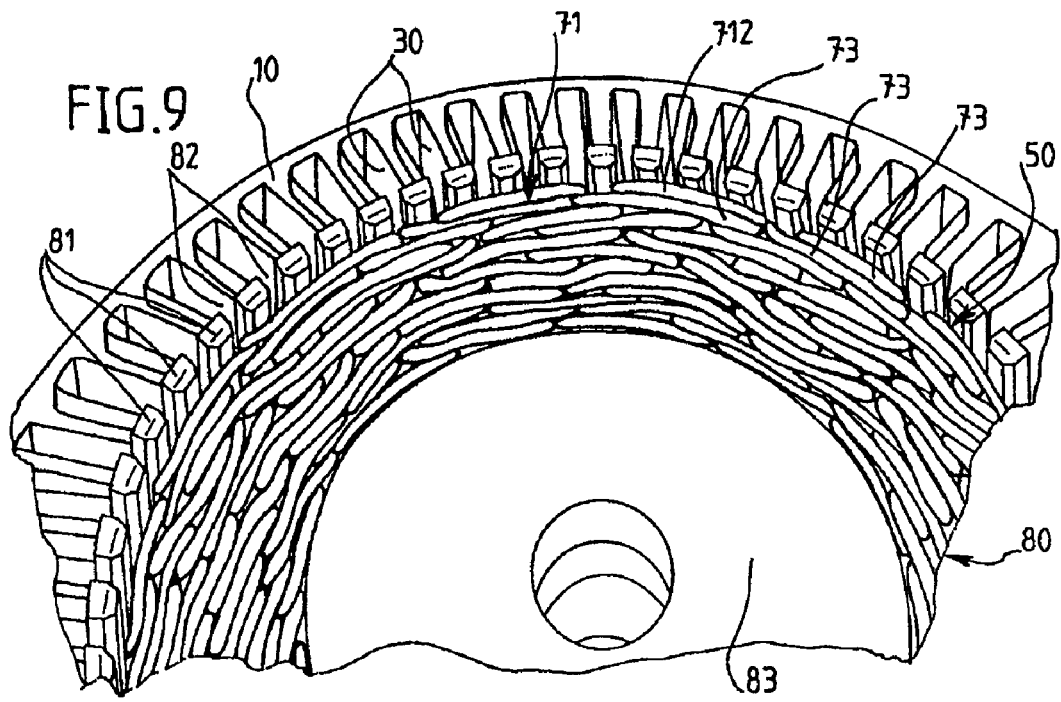
FIG. 9 is a perspective view along arrow IX of FIG. 8.

The fingers 81 come to a halt, and the mushroom 83 continues to move, so that it pushes the top branches 712 axially upwards, as shown in FIG. 9.

The mushroom 83 pushes directly on the top branches 712 of the turns 73 situated lowest, these top branches 712 transmitting this force to the turns situated higher. It can therefore be understood that the mushroom 83 pushes all the turns 73, and that these are all inserted into the slots in a single operation.

This movement has a dual effect. It makes it possible to make the top branches 712 swing above the free ends of the fingers 81, these branches coming to take up a position axially in line with the laminations 10. The branches of the turns 73 situated at the top swing first, and the branches of the turns 73 situated at the bottom swing last.

It also makes it possible to axially pull the linking segments 72 in order to lock them in position on the second side of the laminations 10 and form the winding overhang 40'.

On account of the crenellations 71 of the windings 70 being disposed on the insertion tool 80 in planes practically parallel to the axis of symmetry of this tool, the lateral branches 711 undergo practically no twisting when they are inserted into the slots 30 and when the top branches are swung above the free ends of the fingers 81.

Furthermore, the organization of the turns 73 around the insertion tool 80 allows a highly efficient transmission of the pushing force of the mushroom 83 on the turns 73 furthest away therefrom, that is to say the turns 73 disposed highest on the insertion tool 80.

To this end, the order of winding of the turns 73 makes it possible to achieve that each top branch 712 of a turn comes to rest on at least two top branches 712 of the immediately higher turn, each of these two top branches 712 coming to rest on two other top branches 712 of the yet higher turn, and so on. The pushing force is thus very well distributed circumferentially around the insertion tool.

As all the windings 70 are inserted in a single operation, the mushroom must be able to exert a large pushing force on the top branches 712. To this end, the insertion tool 80 is provided with two actuators, a lower actuator that pushes the mushroom upwards, and a higher actuator that pulls it upwards. The mushroom 83 thus has the power necessary for implementing the placing of the top branches 712 under good conditions.

According to yet another particularly advantageous characteristic, the top branches 712 and the linking segments 72 formed at step 1) have increasing or decreasing axial heights along the windings 70.

As shown in FIG. 3, the winding 70 at the end of step 1) extends in a longitudinal general direction, the lateral branches 711 all extending substantially transversely and all being disposed parallel to one another in a longitudinal alignment.

The top branches 712 of the crenellations 71 are all disposed on the same side of the alignment and are curved, these top branches being concave on the side of the lateral branches 711.

The linking segments 72 are disposed on a side of the alignment opposite to the top branches 712 and also have a curved shape with the concavity turned towards the lateral branches 711.

As will be noted in FIG. 3, all the lateral branches 711 have the same length transversely, but the axial height of the curved top branches 712 and the linking segments 72 varies along the winding 70. Axial height of the curved top branches 712 and the linking segments 72 means the height considered in the transverse direction.

Moreover, the polar pitch, that is to say the longitudinal spacing separating two consecutive lateral branches 711 in the alignment, is constant along the entire winding 70. Exceptionally, two lateral branches 711 can be separated by a different pitch, at singular points of the winding 70.

The turns 73 intended to be inserted first into the slots 30, and whose lateral branches 711 are inserted into radially outer positions of bottoms of slots 30, have, at the end of step 1), top branches 712 and linking segments 72 with transverse heights relatively larger than those of the turns 73 whose lateral branches 711 occupy radially inner positions.

Figure 1A:
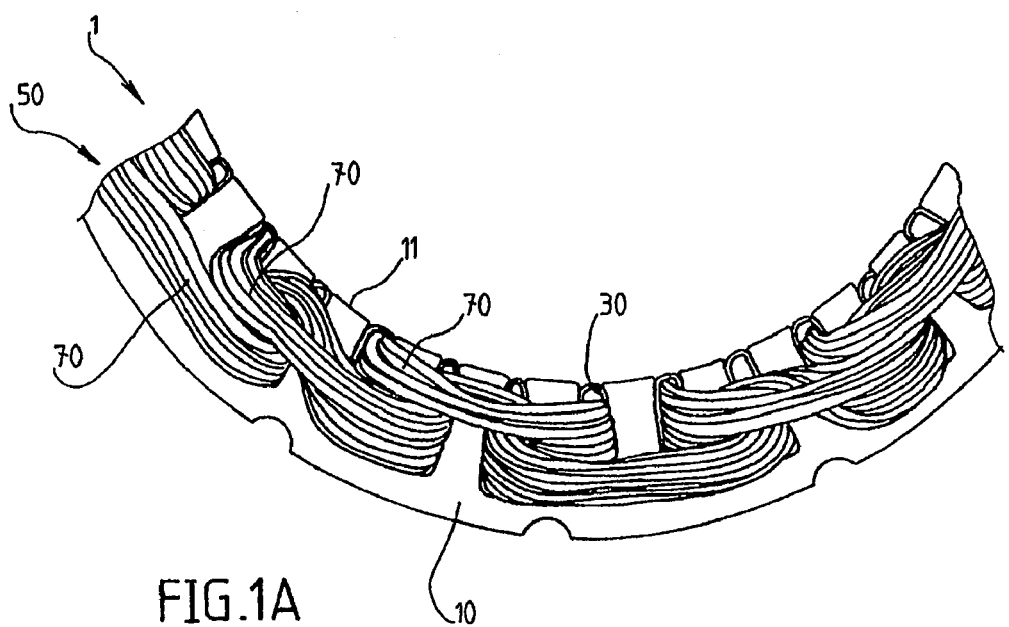
FIGS. 1A and 1B are axial views of part of a stator, respectively obtained in accordance with the method of the prior art and in accordance with the method of the invention.
Figure 1B:
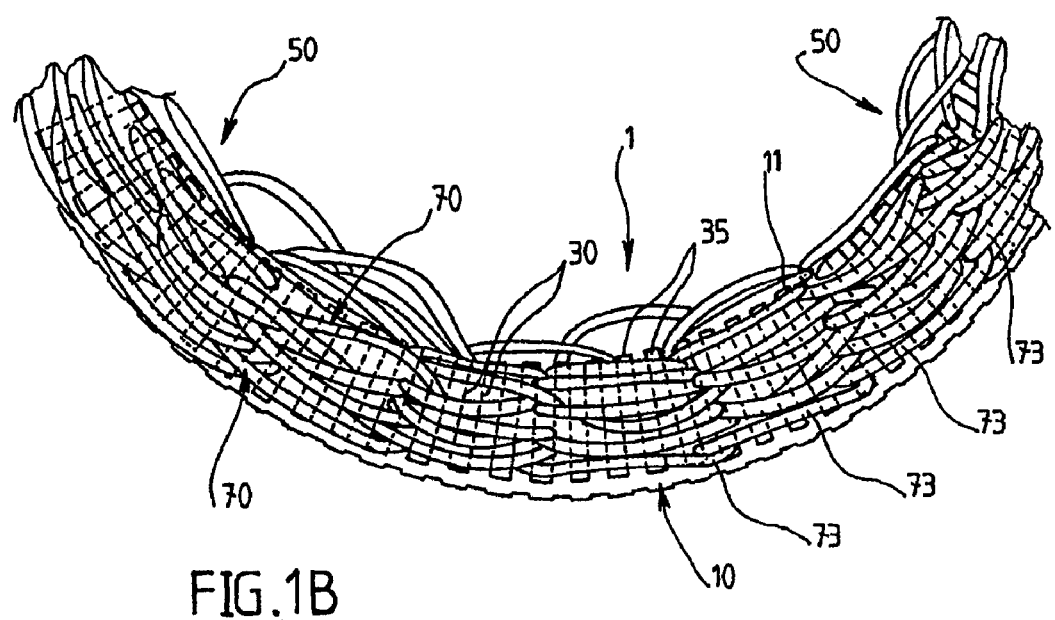

In the example of FIG. 1, all the top branches 712 and the linking segments 72 of the same turn 73 have the same height.

This height decreases regularly from one turn 73 to the next along the winding 70.

It should be clearly understood that it is necessary to keep the same polar pitch all along the winding, so as to make between the branches 711 a constant spacing corresponding to the spacing between the openings of the slots 30 into which these branches will be inserted.

The difference in height between the top branches 712 and the linking segments 72 of the different turns 73 of the same winding compensates for the fact that the successive lateral branches 711 of an outer turn are disposed at the bottom of slots 30 and are spaced further apart from one another than the lateral branches 711 of an inner turn, these branches being disposed at the input of slots 30.

Once the turns have been inserted into the laminations 10, the top branch 712 or the linking segment 72 connecting the two outer branches 711 will be more open than the top branch 712 or the linking segment 72 connecting the two inner branches 711. On account of its larger opening, it will undergo a flattening that will reduce it to the same height as the top branch 712 or the linking segment 72 connecting the two inner branches 711.

Winding overhangs are thus obtained where all the elements have the same axial height, as shown in FIG. 2B.

The variation in transverse height of the turns 73 along a winding 70 which has just been described, and which aims to compensate for the differences in spacing between the branches 711 of the outer and inner turns, can be combined with another variation in transverse height of the turns, intended to obtain winding overhangs arranged in tiers.

This other variation, which is added to the first, means that the top branches 712 or the linking segments 72 of the same winding overhang will have a height that increases or decreases from the outside towards the inside. The stator of the prior art depicted in FIG. 1A has such an arrangement in tiers of the top branches 712 and the linking segments 72 of its winding overhangs. This configuration of winding overhangs facilitates cooling.

A similar result can be obtained using a stator whose winding overhangs consist of elements of the same height, by adding, after step 3), a step 4) of shaping the winding overhangs by mechanically inclining the linking segments 72 and/or the top branches 712 towards the inside or towards the outside.

This inclination is implemented for example by means of jaws moved radially towards the inside or the outside and deforming the linking segments 72 and/or the top branches 712.

According to yet another advantageous characteristic, the method comprises, between steps 1) and 2), a step 1') of local shaping of the wire 60 in areas 61 of this wire intended to cross the wires 60 of other windings 70, or other areas of the same wire, once the windings 70 have been inserted into the stator.

These areas 61 are marked by circles in FIG. 4.

The local shaping of the wire 60 consists of locally deforming the cross-section of the wire 60, or of locally curving the wire 60.

The deformation aims to locally flatten the cross-section, in order to make it less thick in a given direction, but without reducing the total cross-section for current flow. The areas of crossing 61 of the wires 60 are superimposed in said given direction, so that the space requirement of the two stacked wires 60 is reduced. In the case of a wire 60 of round cross-section, the flattening typically leads to formation of an oval cross-section.

The flattening of the area 61 can be implemented by pinching by means of adapted clamps, by stamping in a press equipped with an adapted mould, or by milling using a rotating tool.

Giving an area 61 of the wire 60 a local curvature makes it possible to shift the crossing point of the wires to a less congested location of the winding overhang 40, where the space available is sufficient to allow crossing of the wires 60.

This curvature is implemented by means of hooks locally deforming the wire by pulling on it.

It is known that the wire 60 typically has a round cross-section. So as to facilitate the arranging of the lateral branches 711 in the slots 30 and increase the density of copper in these slots, a circumferential width that is a multiple of the diameter of the wire is chosen for these slots 30.

This width is typically equal to one or two times the diameter of the wire 60. In a variant, the width of the slot is greater than twice the diameter of the wire, for example 3 or 4 times the diameter.

In the case where the slots 30 have a circumferential width corresponding to the diameter of the wire 60, the lateral branch 711 occupying the most radially inner position, that is to say the closest to the internal periphery of the laminations 10, is deformed by broadening in a circumferential direction, as shown in FIG. 11A. Said lateral branch 711 rests on the two opposite radial faces of the slot and is thus locked in position in the slot 30. The lateral branches 711 occupying the other positions are thus held inside the slot 30.

This deformation is carried out after the insertion step 3), typically at three points of the lateral branch 711. It leads to the round cross-section of the wire being transformed into an oval cross-section.

In the case where the slots 30 have a circumferential width equal to at least two diameters of the wire 60 (FIG. 11B), these slots 30 have, on a radially inner side, an opening 31 partially closed on two opposite sides by two axial steps 32, also referred to as tooth feet, projecting from the teeth 35. The lateral branches 711 occupying each slot 30 are held inside it by a flat wedge 33 resting on the steps 32 on an inner side of the slot 30, as shown in FIG. 11B.

This wedge 33 extends over the entire axial length of the slot 30 and is rectangular in shape.

It should be noted that, in the case of slots 30 with a width corresponding to one diameter of wire 60, it is not necessary that the teeth 35 have steps 32 (FIGS. 11B and 11C) and the wedges 33 can be eliminated. The construction of the laminations 10 and the method of inserting the windings 70 into the slots 30 are thus simplified.

Finally, still for the sake of facilitating the arranging of the lateral branches 711 in the slots 30, the slots 30 can have a radial depth that is a multiple of the diameter of the wire 60.

As shown in FIGS. 11A and 11B, the dimensions chosen for the slots 30 mean that the lateral branches 711 of the wire 60 normally come to be arranged in several well-ordered radial alignments at step 3) of insertion into the slots.

It can therefore be clearly understood that the method described above brings many advantages.

The cycle time is short since the insertion of all the phase windings is implemented in a single operation.

Furthermore, the operations of preparing the windings are particularly meticulous and careful. Steps 1) and 1') make it possible, at the end of the insertion step 3), to obtain well-ordered winding overhangs, having few faults. The downstream operations of quality control and fault correction are greatly speeded up, and the cycle time is reduced.

The formation of the winding overhangs is done tidily on account of the pushing force of the mushroom being transmitted well from the turns disposed at the bottom on the insertion tool to the turns disposed at the top. This force is distributed evenly over the entire circumference of the tool.

Finally, this method is adapted to existing tools and requires only few modifications thereof.

Stators conforming to the invention also have advantages.

On account of the alternation of the turns of the different windings in the insertion order, the winding overhangs are particularly well spaced out. Cooling of the winding overhangs is thus greatly facilitated. The flow of cooling air through the winding overhangs can then exceed 10 liters per second.

The conductive wires, as mentioned previously, being made from copper, the density of copper in the slots can be increased up to 65%, this density being the ratio between the surface area of the cross-section of the non-insulated lateral branches and the cross-section of the non-insulated slot. This density is limited to 45% to 50% in the stators of the prior art.

This result is the combined effect of several aspects of the invention.

It is obtained first on account of the insertion of the lateral branches into the slots being done in an ordered manner.

It also results from the good preparation of the areas where the wires cross, which makes it possible to arrange the winding overhang well and therefore optimize the position of the lateral branches 711 in the slots well.

Finally, the choice of dimensions of the slots, the elimination of wedges or the use of rectangular-shaped wedges in replacement for the U-shaped wedges of the prior art also play a part in obtaining this result.

It should be noted that the substantially vertical positioning of the crenellations of the turns on the insertion tool, combined with the fact that the insertion of the turns into the slots is carried out by an axial movement of the tool, makes it possible to practically not deform the wires during insertion. Thus, the crossing areas 61, which undergo a particular shaping before insertion, are not deformed and come to be organized correctly in the winding overhangs of the rotor.

The method described above is adapted to stators comprising any number of slots and to windings comprising any number of phase windings. It is particularly adapted to a stator comprising 36 to 96 slots, corresponding to a rotor of 6 to 8 poles, and to a winding comprising 3 to 6 phase windings.

The winding can be of the simplex wave type or the distributed wave type.

The method is adapted to all wire diameters, here cylindrical in shape with round cross-section or in a variant square, and all the usual stator diameters for motor vehicle alternator stators.

It will be appreciated that the stator according to the invention is advantageously intended to be mounted in an alternator with an internal fan as described for example in the document EP-A-0515 259. Such an alternator comprises a stator surrounding a rotor, for example a claw rotor or a salient-pole rotor.

The rotor is attached to a shaft mounted so as to rotate centrally by means of ball bearings in a housing in two parts referred to as a front end plate and a rear end plate. The end plates are hollow and each has a bottom provided with openings, for the formation of air inlets, and a peripheral rim also provided with openings for the formation of an air outlet. The bottoms of the end plates are of transverse orientation overall and have centrally a ball bearing for rotational mounting of the rotor support shaft. The bottoms are each extended at their outer periphery by the peripheral rim of axial orientation overall and with a shoulder for mounting the body of the stator having the winding with a plurality of phase windings whose winding overhangs extend projecting axially either side of the stator body, underneath the openings of the peripheral rims of the end plates assembled for example by means of bolts or tie rods, for forming the housing for accommodating the stator and the rotor. The rotor has at at least one of its axial ends a fan installed radially underneath the winding overhang concerned. The rear end plate has at least one brush holder, whilst a pulley, attached to the rotor support shaft, is adjacent to the front end plate. For the other components of the alternator, reference should be made to the aforementioned document, bearing in mind that the claw rotor with a field winding can be replaced by a salient-pole stator having several field windings. A bridge rectifier, for example a diode bridge, is connected to the phase windings. In a variant, this bridge rectifier is formed to also make an inverter, as described for example in the document FR-A-2 745 444, in order to inject current into the phase windings of the stator to make the alternator function as an electric motor in particular for starting the heat engine of the motor vehicle, such an alternator being referred to as an alternator starter.

In all cases, when the rotor support shaft turns, the fan or fans make it possible to create an air current between the air inlet and outlet openings passing through the winding overhangs of the winding according to the invention. More precisely, the step of preparing the wires separately, and then the step of organizing the phase windings before their insertion into the slots, make it possible to give the end windings, referred to as winding overhangs, of the stator symmetrical characteristics making it possible to create in the winding overhangs air flow apertures and slopes which improve the circulation of the air through the winding overhangs, for example above 10 liters per second.

Of course, in a variant, one winding overhang can be axially higher than the other by virtue of the tool according to the invention.

Of course, the slot insulators are placed and advantageously fixed in the slots before the wires are inserted into the slots. For simplicity, FIGS. 11A and 11B do not depict the slot insulator that can be seen in FIGS. 1A, 2B, 9 and 11C.

The cross-section of the conductive wires can be round, as in the figures, or square, or rectangular or elliptical or some other shape.

In the figures, the body of the stator is cylindrical in shape. In a variant, the outer periphery of the stator body is non-cylindrical in shape for example barrel-shaped. The slots, formed in each lamination of the laminations, are in a variant inclined with respect to the axial direction.

By virtue of the invention, the polyphase rotating electrical machine equipped with the stator with a winding according to the invention is more powerful.

Each phase winding comprises one or more wires. For example each phase winding can comprise at least two wires.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of inserting a wave winding into a stator of a polyphase rotating electrical machine, the stator comprising:
   (A) laminations with a hole through the center and having an axis of symmetry and
   (B) slots running axially along a radially inner faceof the laminations, these slots providing a plurality of receiving positions arranged in tiers radially, and
   (C) the winding comprising a plurality of phase windings each having an electrically conductive continuous wire, the method comprising the following steps:
   shaping each winding, the wire thereof being formed into a succession of crenellations connected by linking segments, each crenellation comprising two lateral branches facing one another each intended to be inserted at a receiving position of a slot, and a top branch connecting the two lateral branches;
   placing the windings on an insertion tool;
   inserting the windings into the slots of the stator,
   wherein the step of placing the windings is implemented on a cylindrical insertion tool, each winding constituting several turns around the insertion tool, these turns being superimposed in a given order,
   and in that the windings are wound around the insertion tool at the same time, the turns that follow one another in said given winding order belonging alternately to the different windings;
   and in that the windings comprise overhangs;
   a) each of which runs from (i) a branch in one slot to (ii) another in another slot and runs along an axial end of the stator;
   b) in which an overhang located at a radially inner position in a slot has a transverse height which is relatively small; and c) in which an overhang located at a radially outer position in a slot has a transverse height which is relatively large.

2. The method according to claim 1, wherein the step of inserting the turns into the slots of the stator is implemented in the reverse order to the winding order, the lateral branches of these turns progressively occupying radially more inner positions.

3. The method according to claim 1, wherein the winding order comprises a succession of identical sequences, each sequence consisting of one turn of each winding.

4. The method according to claim 1, wherein, on the insertion tool, the crenellations extend in respective planes parallel to the axis of symmetry of the insertion tool, or slightly inclined with respect to this axis.

5. The method according to claim 1, wherein step 3) of inserting the windings into the slots is implemented by moving the insertion tool along the axis of symmetry of the stator.

6. The method according to claim 1, wherein the top branches of the crenellations are curved and form a winding overhang on a first axial side of the stator.

7. The method according to claim 6, wherein the linking segments connect two respective lateral branches of two neighboring crenellations along the wire and have a curved shape, these segments forming a winding overhang on a second axial side of the stator opposite to the first.

8. The method according to claim 7, wherein the top branches and/or the linking segments formed at step 1) have increasing or decreasing heights along the windings.

9. The method according to claim 8, wherein the turns whose lateral branches are inserted in radially outer positions of bottoms of slots have top branches and/or linking segments with heights relatively greater than the turns whose lateral branches occupy radially inner positions.

10. The method according to claim 1, wherein it comprises, after step 3), a step 4) of shaping the winding overhangs by inclining the linking segments and/or the top branches towards the inside.

11. The method according to claim 1, wherein it comprises, after step 3), a step 4) of shaping the winding overhangs by inclining the linking segments and/or the top branches towards the outside.

12. The method according to claim 1, wherein it comprises, between steps 1) and 2), a step 1') of local shaping of the wire in areas of this wire intended to cross other wires, or other areas of the same wire, once the windings have been inserted into the stator.

13. The method according to claim 1, wherein the wire has a round cross-section, the slots having a circumferential width that is a multiple of the diameter of the wire.

14. The method according to claim 13, wherein the slots have a circumferential width corresponding to the diameter of the wire, the lateral branch occupying the radially most inner position being deformed by broadening in a circumferential direction so as to hold the lateral branches occupying the other positions inside the slot.

15. The method according to claim 13, wherein the slots have a circumferential width equal to at least two diameters of the wire and have on a radially inner side an opening partially closed on two opposite sides by two axial steps, the lateral branches occupying the slots being held inside it by a flat wedge resting on the steps on an inner side of the slot.

* * * * *